Patented Feb. 22, 1966

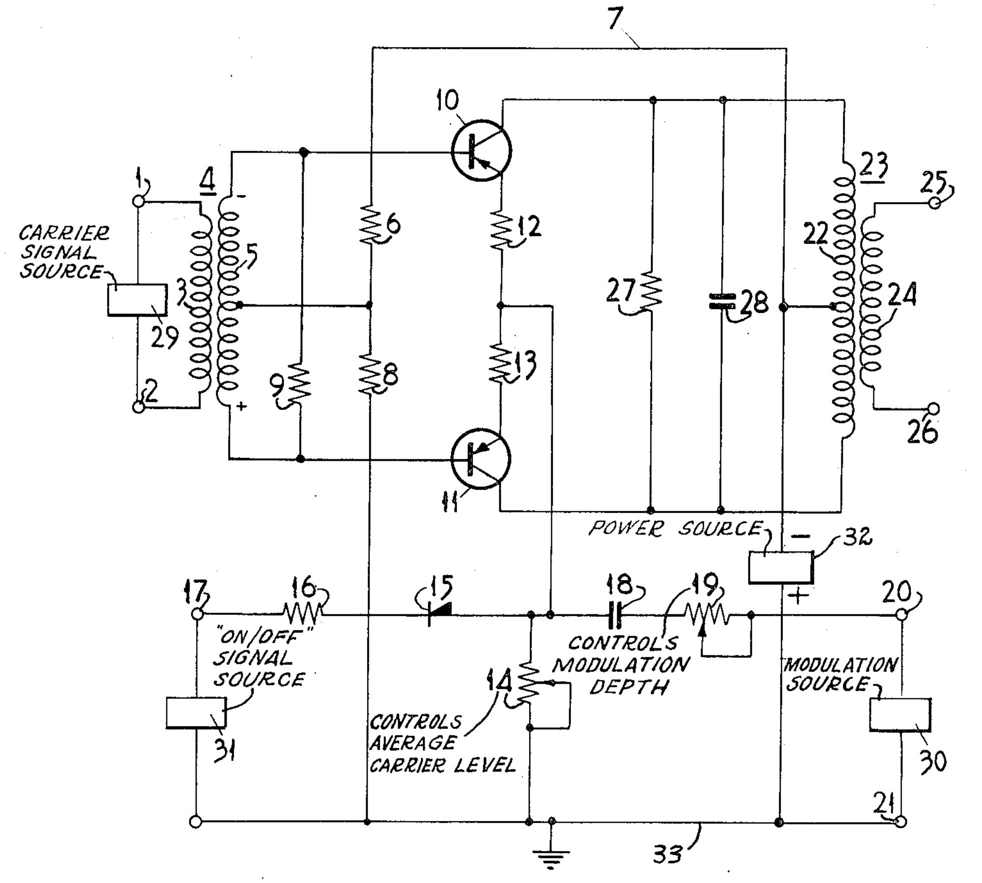
INVENTORS
RICHARD MAURICE ALLEN
IVOR JAMES STUART WILLIAMS
BY
Kirchstein, Kirchstein & Ottinger
ATTORNEYS United States Patent Office 3,237,129

3,237,129

PUSH-PULL MODULATOR CIRCUIT WITH MEANS TO VARY THE OUTPUT LEVEL OF THE CARRIER AND SIDEBANDS

Richard Maurice Allen, London, and Ivor James Stuart Williams, Coventry, England, assignors to The General Electric Company Limited, Victoria, London, England Filed Mar. 25, 1963, Ser. No. 267,469
Claims priority, application Great Britain, Mar. 26, 1962, 11,435/62
5 Claims. (Cl. 332—38)

This invention relates to push-pull modulator circuits. More particularly the present invention is concerned with modulator circuits of the type in which a carrier signal is arranged to be modulated by a modulating signal, the output signal supplied by the modulator comprising a carrier frequency component together with the upper and lower sidebands. Hereinafter such an arrangement will be referred to as a "transmitted-carrier modulator circuit."

According to the present invention, a transmitted-carrier modulator circuit comprises a first tapped impedance, a second impedance, two junction transistors each having base, collector and emitter electrodes, the base electrodes of the transistors being connected to the two ends respectively of said first impedance, the emitter electrodes being connected to a common point and the collector electrodes being connected to the two ends respectively of said second impedance, in operation, the carrier signal being applied across said first impedance, the modulating signal being applied between the tapping on said first impedance and said common point and the output signal being derived from said second impedance, while the arrangement is such that as far as the carrier signal is concerned, the circuit is a push-pull circuit.

Said first impedance may be in two parts, in which case the junction between the two parts would form the tapping.

Said first impedance may be the secondary winding of an input transformer across the primary winding of which the carrier signal is arranged to be applied. Said second impedance may be the primary winding of an output transformer, the output signal being arranged to be derived from across the secondary winding of said output transformer.

Preferably means is provided to enable a direct current bias to be applied to said transistors such that at least the carrier frequency component is substantially prevented from being supplied in the output signal, said means being arranged to be used for signalling by suppression of the carrier signal.

A transmitted-carrier modulator circuit in accordance with the present invention will now be described by way of example with reference to the accompanying drawing, which shows the circuit.

Referring now to the drawing, the circuit has a pair of input terminals 1 and 2, between which a carrier signal from a source 29 is arranged to be supplied. The carrier signal source 29 may, for example, be a crystal controlled transistor oscillator.

The terminals 1 and 2 are connected to the two ends respectively of the primary winding 3 of a transformer 4, which has a centre-tapped secondary winding 5. The centre tapping of the winding 5 is connected by way of a resistor 6 to a negative supply line 7, and by way of a resistor 8 to earth. A D.C. power source 32 is connected between the negative line 7 and the earthed line 33. A resistor 9 is connected in parallel with the winding 5.

The ends of the winding 5 are connected to the base electrodes of p-n-p junction transistors 10 and 11, respectively. The emitter electrodes of the transistors 10 and 11 are connected together by way of resistors 12 and 13 in series, the junction of the resistors 12 and 13 being connected to earth by way of a variable resistor 14.

The junction of the resistors 12 and 13 is also connected by way of a rectifier element 15 and a resistor 16 in series to a terminal 17. The rectifier element 15 has its cathode terminal nearer the terminal 17.

The junction of the resistors 12 and 13 is also connected by way of a capacitor 18 and a variable resistor 19 to a terminal 20. The modulating signal, in this case an audio frequency signal, is arranged to be supplied, by a source 30, between the terminal 20, and a terminal 21 which is earthed.

The collector electrodes of the transistors 10 and 11 are connected to the two ends respectively of the primary winding 22 of an output transformer 23. The winding 22 has a centre tapping which is connected to the supply line 7. The two ends of the secondary winding 24 of the transformer 23 are connected to output terminals 25 and 26, the required output signal being developed between the terminals 25 and 26 during operation.

Connected in parallel with the winding 22 are a resistor 27 and a capacitor 28.

The operation of the circuit is then as follows. The carrier signal from the source 29 is supplied between the terminals 1 and 2, and is therefore applied to the base electrodes of the transistors 10 and 11. The signals developed at the collector electrodes of the transistors 10 and 11 are combined in the transformer 23 and supplied to the terminals 25 and 26 as the output signal. This output signal comprises the carrier signal with upper and lower sidebands. The output level of the carrier signal may be controlled by the variable resistor 14, which controls the current flowing in the transistors 10 and 11.

The audio frequency signal from the source 30 is supplied between the terminals 20 and 21 and is therefore supplied to the emitter electrodes of the transistors 10 and 11. The output level of the sidebands may be controlled by the variable resistor 19.

The nominal operating value of the variable resistor 19 may be selected to match the impedance of the preceding audio frequency stage, and if required a transformer may be included in the audio frequency input to the circuit to match the impedance of the preceding stage.

The value of the capacitor 18 is such that it presents a low impedance to the audio frequency signal, the capacitor 18 being provided to avoid the possibility of the preceding audio frequency stage putting a low resistance shunt across the variable resistor 14. The resistors 12 and 13 are of equal value and are provided to stabilise the operating conditions of the transistors 10 and 11, so that the transistors 10 and 11 need not be accurately matched.

The transistors 10 and 11 act as a class AB push-pull amplifier to the carrier signal, each half cycle of the carrier signal, in turn, being modulated by the audio frequency signal. The principle of the modulation is that the circuit acts as a push-pull limiter to the carrier signal, the limiting point for alternate half-cycles of the carrier signal being determined by the current flowing into the emitter electrode of the transistor 10, say, when the transistor 11 is cut off. This current is varied by the audio frequency signal supplied by the source 30, thereby giving amplitude modulation of the carrier signal.

The level of the output signal is substantially independent of changes in the input level of the carrier signal so long as the input level is sufficiently high to cause the circuit to limit.

The circuit is balanced, so there is little leakage of the audio frequency signal to the output of the circuit.

The input impedance of the circuit, presented to the carrier signal, is determined by the turns ratio of the transformer 4 and the value of the resistor 9, and is therefore substantially unaffected by changes in the transistors 10 and 11, or by changes in their working levels. Similarly, the output impedance of the circuit is determined by the turns ratio of the transformer 23 and the value of the resistor 27, and is similarly unaffected by the transistors 10 and 11. The capacitor 28 is provided to correct for the leakage inductance of the transformer 23.

The circuit also enables "on/off" carrier signalling to be used. This is done by applying a suitable negative voltage from a source 31 to the terminal 17. The effect of this is to bias the transistors 10 and 11 so as to be non-conducting, so that the carrier signal is not then able to reach the winding 22. The resistor 16 is included to limit the current flowing into the emitter electrodes of the transistors 10 and 11, whilst the rectifier element 15 is included to prevent the carrier or audio frequency signal from reaching the terminal 17 and thus getting into the "on/off" signalling circuit.

We claim:

1. A transmitted-carrier push-pull modulator circuit comprising two junction transistors each having emitter, base and collector electrodes, first and second supply lines, means to maintain a unidirectional potential difference between said supply lines, means connecting the emitter electrodes of said transistors to a common point, means including first variable resistance means connecting said common point to the first of said supply lines, means to provide direct current connections between the collector electrodes of said transistors and the second of said supply lines, means to supply carrier signals in opposite phase to the base electrodes of said transistors, means including second variable resistance means to vary the current through said first variable resistance means in dependence upon a modulating signal, and means to derive an output signal from the collector circuits of said transistors, in operation the amplitude of the carrier signals being sufficiently high to bias off each of the transistors in turn, the arrangement enabling adjustment of the mean level of the output signal and of the modulation depth to be effected by changing the values of the first and second variable resistors respectively.

2. A transmitted-carrier push-pull modulator circuit comprising two junction transistors each having emitter, base and collector electrodes, first and second supply lines, means to maintain a unidirectional potential difference between said supply lines, means connecting the emitter electrodes of said transistors to a common point, means including first variable resistance means connecting said common point to the first of said supply lines, means to provide direct current connections between the collector electrodes of said transistors and the second of said supply lines, means to supply carrier signals in opposite phase to the base electrodes of said transistors, means including second variable resistance means to apply a modulating signal voltage across said first variable resistance means, and means to derive an output signal from the collector circuits of said transistors, in operation the amplitude of the carrier signals being sufficiently high to bias off each of the transistors in turn, the arrangement enabling adjustment of the mean level of the output signal and of the modulation depth to be effected by changing the values of the first and second variable resistors respectively.

3. A transmitted-carrier push-pull modulator circuit in accordance with claim 2 wherein the means to supply carrier signals to the base electrodes of the transistors includes an input transformer having a primary winding and a center-tapped secondary winding, means to supply a carrier signal to said primary winding, means connecting the two ends of said secondary winding to the two base electrodes respectively and means connecting the center-tap of said secondary winding to a source of direct current bias.

4. A transmitted-carrier push-pull modulator circuit in accordance with claim 2 including an output transformer having a center-tapped primary winding and a secondary winding, the means to provide direct current connections between the collector electrodes of the transistors and the second supply line including respective halves of said primary winding.

5. A transmitted-carrier push-pull modulator circuit comprising two junction transistors each having emitter, base and collector electrodes, first and second supply lines, means to maintain a unidirectional potential difference between said supply lines, means connecting the emitter electrodes of the transistors to a common point, a first variable resistor connecting said common point to said first supply line, means including a second variable resistor to apply a modulating signal voltage across said first variable resistor, an input transformer having a primary winding and a center-tapped secondary winding, means to supply a carrier signal to the primary winding of said input transformer, means connecting the two ends of the secondary winding of said input transformer to the base electrodes of said transistors respectively, means to supply a bias voltage to the center-tap of said secondary winding, an output transformer having a center-tapped primary winding and a secondary winding, means connecting the collector electrodes of said transistors to the two ends respectively of the primary winding of said output transformer and means connecting the center-tap of the primary winding of said output transformer to the second supply line, the arrangement enabling adjustment of the mean level of the output signal and of the modulation depth to be effected by changing the values of the first and second variable resistors respectively.

References Cited by the Examiner

UNITED STATES PATENTS

| | | | |
|---|---|---|---|
| 2,832,051 | 4/1958 | Raisbeck. | |
| 2,890,418 | 6/1959 | Zawels. | |
| 3,027,522 | 3/1962 | Boxall et al. | 332—44 |
| 3,101,455 | 8/1963 | Masher | 332—44 |
| 3,166,722 | 1/1965 | Reid | 332—43 |

HERMAN KARL SAALBACH, *Primary Examiner.*

ALFRED L. BRODY, ELI LIEBERMAN, *Examiners.*

P. L. GENSLER, *Assistant Examiner.*